United States Patent
Wang et al.

(10) Patent No.: US 9,744,465 B2
(45) Date of Patent: Aug. 29, 2017

(54) IDENTIFY PLUG-IN OF EMU CLASS INTERNET GAME

(71) Applicant: TENCENT TECHNOLOGY (SHENZHEN) COMPANY LIMITED, Shenzhen (CN)

(72) Inventors: Xuxin Wang, Shenzhen (CN); Jianhui Yao, Shenzhen (CN); Xianwen Chen, Shenzhen (CN); Cheng Cai, Shenzhen (CN); Wen Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 222 days.

(21) Appl. No.: 14/586,546

(22) Filed: Dec. 30, 2014

(65) Prior Publication Data

US 2015/0119148 A1    Apr. 30, 2015

Related U.S. Application Data

(63) Continuation of application No. PCT/CN2013/078875, filed on Jul. 5, 2013.

(30) Foreign Application Priority Data

Jul. 6, 2012   (CN) .......................... 2012 1 0232889

(51) Int. Cl.
   *A63F 13/35*      (2014.01)
   *A63F 13/73*      (2014.01)
   (Continued)

(52) U.S. Cl.
   CPC ............ *A63F 13/73* (2014.09); *A63F 13/335* (2014.09); *A63F 13/35* (2014.09); *A63F 13/58* (2014.09); *A63F 13/75* (2014.09); *A63F 13/822* (2014.09)

(58) Field of Classification Search
   CPC .......... A63F 13/35; A63F 13/75; A63F 13/77; A63F 13/79; A63F 13/332; A63F 13/12;
   (Continued)

(56) References Cited

U.S. PATENT DOCUMENTS 7,056,217 B1 *   6/2006   Pelkey ................... A63F 13/12
                                                      463/25
7,169,050 B1 *   1/2007   Tyler ..................... A63F 13/12
                                                      463/1
(Continued)

FOREIGN PATENT DOCUMENTS

CN       101105825 A      1/2008
CN       102163251 A      8/2011
(Continued)

OTHER PUBLICATIONS

Extended European Search Report for European Patent Application No. 13813568.6, dated Oct. 19, 2015, in 6 pages.
(Continued)

*Primary Examiner* — Michael Cuff
(74) *Attorney, Agent, or Firm* — Knobbe Martens Olson & Bear LLP

(57) ABSTRACT

An Emulator (EMU) configures a monitoring condition relevant with critical data of a game role, when the monitoring condition is met, the EMU transmits the critical data of the game role to a server; the server analyzes the critical data of the game role; when determining that the critical data of the game role is unusual, the server determines that the game role has used a plug-in.

17 Claims, 4 Drawing Sheets

(51) Int. Cl.
*A63F 13/822* (2014.01)
*A63F 13/335* (2014.01)
*A63F 13/75* (2014.01)
*A63F 13/58* (2014.01)

(58) Field of Classification Search
CPC .............. A63F 13/352; A63F 2300/535; A63F 2300/552; A63F 2300/558; A63F 2300/5586
USPC .............................................. 463/40, 42, 29
See application file for complete search history.

(56) References Cited

U.S. PATENT DOCUMENTS

| | | | | |
|---|---|---|---|---|
| 7,785,180 | B1* | 8/2010 | von Ahn | A63F 13/10 463/9 |
| 8,376,855 | B2* | 2/2013 | Lockton | A63F 13/75 463/29 |
| 9,087,437 | B2* | 7/2015 | Kroeckel | G07F 17/3295 |
| 2002/0103019 | A1 | 8/2002 | Emmerson | |
| 2003/0177187 | A1* | 9/2003 | Levine | A63F 13/10 709/205 |
| 2004/0242321 | A1* | 12/2004 | Overton | G06F 21/128 463/29 |
| 2005/0288103 | A1* | 12/2005 | Konuma | A63F 13/12 463/42 |
| 2006/0100021 | A1* | 5/2006 | Yoshino | A63F 13/00 463/45 |
| 2006/0168147 | A1* | 7/2006 | Inoue | A63F 13/12 709/219 |
| 2007/0238528 | A1* | 10/2007 | Harris | A63F 13/12 463/42 |
| 2008/0207327 | A1* | 8/2008 | Van Luchene | A63F 13/12 463/42 |
| 2008/0305869 | A1* | 12/2008 | Konforty | A63F 13/12 463/29 |
| 2009/0094600 | A1* | 4/2009 | Sargaison | G06F 8/61 717/177 |
| 2009/0191968 | A1* | 7/2009 | Johnson | A63F 13/10 463/37 |
| 2010/0311503 | A1* | 12/2010 | McMain | A63F 13/58 463/36 |
| 2012/0108327 | A1* | 5/2012 | Tandon | H04L 67/125 463/29 |
| 2013/0072306 | A1* | 3/2013 | Parnprome | A63F 13/35 463/42 |
| 2013/0344940 | A1* | 12/2013 | Kurabayashi | A63F 13/47 463/23 |

FOREIGN PATENT DOCUMENTS

| | | |
|---|---|---|
| CN | 102340581 A | 2/2012 |
| CN | 102486815 A | 6/2012 |
| CN | 102510380 A | 6/2012 |
| JP | 2002-355445 | 12/2002 |
| JP | 2006-081609 | 3/2006 |
| JP | 2006-191975 | 7/2006 |
| JP | 2009-532187 | 9/2009 |
| JP | 2010-509992 | 4/2010 |
| WO | WO 2007/115299 A2 | 10/2007 |
| WO | WO 2008/063579 A2 | 5/2008 |

OTHER PUBLICATIONS

Kaiser et al. "Fides: Remote Anomaly-Based Cheat Detection Using Client Emulation" Proceedings of the 16th ACM Conference on Computer and Communications Security, CCS 2009, pp. 269-279.

International Search Report for International Application No. PCT/CN2013/078875, mailed on Oct. 17, 2013.

International Preliminary Report on Patentability and Written Opinion of the International Searching Authority for International Application No. PCT/CN2013/078875, mailed on Jan. 15, 2015, in 8 pages.

Office Action issued in Chinese Patent Application No. 201210232889.7 on Jul. 23, 2014.

Office Action issued in Chinese Patent Application No. 201210232889.7 on Feb. 10, 2015.

Office Action Issued in Japanese Patent Application No. 2015-518827, dated Mar. 15, 2016, 6 pages.

* cited by examiner

IDENTIFY PLUG-IN OF EMU CLASS INTERNET GAME

This application is a continuation of International Application No. PCT/CN2013/078875, filed on Jul. 5, 2013, which claims priority to Chinese patent application No. 201210232889.7, filed on Jul. 6, 2012, the contents of which are incorporated herein by reference in their entirety.

TECHNICAL FIELD

The present disclosure relates to electronic game technologies, and more particularly, to a method and system for identifying a plug-in of an Emulator (EMU) class Internet game, and a corresponding storage medium.

BACKGROUND OF THE INVENTION

An electronic game may also be referred to as a video game. The electronic game is an entertainment mode, with which a person may play a game by using an electronic device, such as a computer, a recreational machine.

Accompanying with rapid development of computer technologies and network technologies, functions of the Internet in people's daily lives, study and work are growing. A game platform may provide an Internet user with an online service about multiplayer computer game, which may allow game players in the Internet playing a game easily with the Internet, just as in a same Local Area Network (LAN). By employing network protocol converting technologies, the game platform may closely connect Internet game players separated by thousands of miles with each other, meanwhile may provide a real-time interaction and communication for users. Any game, which may be online with a LAN, may be played on the game platform in the manner of LAN. No dedicated server is necessary. No longer necessary to remember a complicated IP address. A game player may play a game with others conveniently. All of the game players in a room of a game platform may randomly communicate with or play a game with each other via a LAN, or improve each other by active discussion, just as in a same network area, so as to enjoy funs of the game.

SUMMARY OF THE INVENTION

The present disclosure provides a method for identifying a plug-in of an EMU class Internet game, so as to identify a plug-in, and improve the fairness of a game.

The present disclosure also provides a system for identifying a plug-in of an EMU class Internet game, so as to identify a plug-in, and improve the fairness of a game.

The technical solution of the present disclosure is as follows.

A method for identifying a plug-in of an EMU class Internet game, including:

configuring, by an EMU, a monitoring condition relevant with critical data of a game role;

when determining the monitoring condition is met, transmitting, by the EMU, the critical data of the game role to a server, such that the server analyzes the critical data of the game role, and determines that the game role has used the plug-in, when the server determining that the critical data of the game role is unusual.

A method for identifying a plug-in of an EMU class Internet game, including:

configuring, by an EMU, a monitoring condition relevant with critical data of a game role;

when determining the monitoring condition is met, transmitting, by the EMU, the critical data of the game role to a server;

analyzing, by the server, the critical data of the game role;

when determining the critical data of the game role is unusual, determining, by the server, the game role has used the plug-in.

A client for identifying a plug-in of an EMU class Internet game, including an interface, a memory, and a processor in communication with the memory, wherein the memory is configured to store critical data of a game role, and a group of instructions, which are executed by the processor to implement an EMU, and the EMU is configured to:

set a monitoring condition relevant with the critical data of the game role;

when the monitoring condition is met, transmit the critical data of the game role to a server via the interface, such that the server analyzes the critical data of the game role, and determines that the game role has used the plug-in, when the server determining that the critical data of the game role is unusual.

Based on foregoing technical solutions, it can be seen that in the examples of the present disclosure, an EMU may configure a monitoring condition relevant with critical data of a game role, when the monitoring condition is met, the EMU may transmit the critical data of the game role to the server; the server may analyze the critical data of the game role, when determining the critical data of the game role is unusual, the server may determine that the game role has used a plug-in. Thus, it can be seen that, by employing the technical solution of the present disclosure, the critical data of the game role about a game player in a game, such as number of lives, blood, score, may be monitored and transmitted to the server, so as to be checked by the server. Subsequently, plug-in behavior of a player may be discovered timely.

Meanwhile, by employing the technical solution of the present disclosure, corresponding processing may be performed on a player with a plug-in, so as to further improve the fairness of a game. In addition, in accordance with the technical solution of the present disclosure, anti-plug-in functions may be implemented without modifying a game program, which may be implemented easily.

BRIEF DESCRIPTIONS OF THE DRAWINGS

EMBODIMENTS OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

An emulator (EMU) is a program, and means "simulator". The EMU may enable a computer or another multimedia platform (handheld computer, mobile phone) to run a program of another platform, which is a Television (TV) game or an Arcade EMU in most cases. The EMU is software, which may run a program, by converting a program instruction of another platform into an instruction recognized by the EMU. The EMU class game is a game program of a non-local machine game platform, which may be run in the EMU. For example, in current Arclive game platform, multiple game players may play an online game simultaneously.

The plug-in refers to a cheating program dedicated for one or more network games, which is made by a person utilizing computer technologies and modifying part of the program about network game software.

At present, the EMU class Internet game doesn't possess functions of identifying a plug-in, not to mention corresponding functions of anti-plug-in. Subsequently, in current EMU class Internet game, a game player may randomly modify and lock a memory value, so as to achieve the purpose of profit in the game. The fairness of the game may be undermined, and the normal order of the game may also be interfered with.

Compared with games of other types, the EMU class Internet game may possess a certain particularity. Generally speaking, game program of the EMU class Internet game may not possess the anti-plug-in function. The EMU class Internet game may be run in an EMU. The EMU may control the execution flow and data of the game program.

Besides, since it is difficult for a plug-in to change or lock a stack calling sequence of an EMU, during the process of running a game, as well as a temporary variable within the stack (when the plug-in attempts to change or lock, the EMU probably crashes or can't continuously run, subsequently, the purpose of profit with the plug-in cannot be achieved), functions of anti-plug-in may be achieved by employing the technical solution of the present disclosure, based on operations of the EMU.

Figure 1:
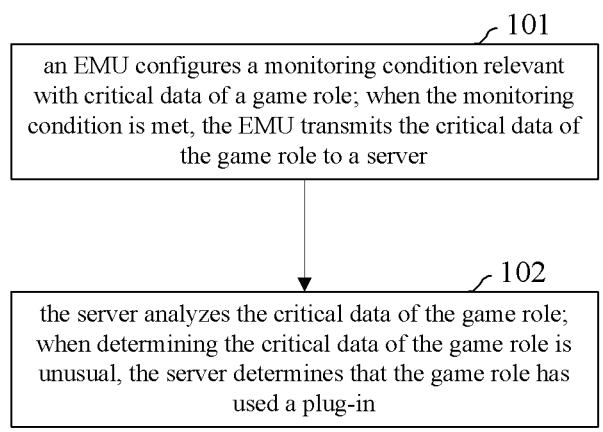
FIG. 1 is a flowchart illustrating a method for identifying a plug-in of an EMU class Internet game, in accordance with an example of the present disclosure.

FIG. 1 is a flowchart illustrating a method for identifying a plug-in of an EMU class Internet game, in accordance with an example of the present disclosure.

As shown in FIG. 1, the method may include the following blocks.

Block 101, an EMU may configure a monitoring condition relevant with critical data of a game role. When the monitoring condition is met, the EMU may transmit the critical data of the game role to a server.

The EMU is software, which may run a program, by converting a program instruction of another platform into an instruction recognized by the EMU. A game program of a non-local machine run in an EMU is an EMU game.

In accordance with an example of the present disclosure, cheating behavior and game state of a player may be discovered timely, by focusing on and monitoring the critical data of a game role. Subsequently, whether a game role has used a plug-in may be identified.

In the example of the present disclosure, specifically speaking, the critical data of the game role may include: a blood value, a blood operation value, an operation type of blood value, (e.g., initialize a role blood value, increase a role blood value, reduce a role blood value); a Health Point (HP), an HP operation value, an HP operation type (e.g., initialize a role HP, increase a role HP, reduce a role HP); an experience value, an experience operation value, an operation type of the experience value (e.g., initialize a role experience value, increase a role experience value, reduce a role experience value); an equipment value, an equipment operation value, an operation type of the equipment value (e.g., initialize a role equipment value, increase a role equipment value, reduce a role equipment value); a score, a score operation value, or a score operation type (e.g., initialize a role score, increase a role score, reduce a role score), and so on.

Although foregoing exemplary examples about critical data of the game role are listed in detail, persons having ordinary skill in the art may easily learn that, the foregoing exemplary examples may be not used for limiting the protection scope of the present disclosure.

Specifically speaking, the process of the EMU configuring the monitoring condition about critical data of the game role may include the follows. The EMU configures a monitoring address and a monitoring instruction, which are relevant with the critical data of the game role.

For example, the monitoring address relevant with the critical data of the game role may include an address used for storing the critical data of the game role.

For another example, specifically speaking, these monitoring instructions may include a function calling instruction relevant with the critical data of game role, a function returning instruction relevant with the critical data of game role, a sequence execution instruction relevant with the critical data of game role, a condition jumping instruction relevant with the critical data of the game role, and so on.

When an access operation about the monitoring address, which is relevant with the critical data of game role, is involved in a game program, and/or, a monitoring instruction relevant with the critical data of game role is involved in a game program, the game program may be regarded as suspicious. At this time, the monitoring condition is met, and the critical data of game role may be transmitted to the server, such that the server may determine whether there is a plug-in.

Furthermore, to enhance information security, the EMU may transmit encrypted critical data of game role to the server. The critical data of game role may be encrypted with multiple existing encryption modes.

For example, the critical data of game role may be encrypted with a private key, and/or, a public key. Specifically speaking, multiple encryption algorithms, such as md5, aes, des, hash, may be employed.

Although the foregoing data encryption algorithms, which may be employed by the EMU, are listed in detail. Persons having ordinary skill in the art may easily learn that the foregoing data encryption algorithms are exemplary, which are not used for limiting the implementation modes of the present disclosure.

Block 102, the server analyzes the critical data of the game role. When determining the critical data of the game role is unusual, the server may determine that the game role has used a plug-in.

After receiving the critical data of the game role, the server may analyze whether the critical data of the game role is reasonable. The foregoing analyzing process may be relevant with the type and state of the game program. When analyzing that the critical data of the game role is not reasonable, the server may determine that the game role has used a plug-in. When analyzing that the critical data of the game role is reasonable, a corresponding operation may be performed on the data of the server side. And then, a corresponding process may be performed on the role state.

For example, when finding that a critical data value of a game role doesn't comply with game state, the server may determine that the critical data value of the game role is unusual, and the game role has used a plug-in.

Specifically speaking, when the server determines that role blood value stored by a player is 0, meanwhile the player is still active, the server may further determine that the player has used a plug-in. When the server determines that an HP stored by a player is 0, meanwhile the player is still active, the server may further determine that the player has used a plug-in, and so on.

Based on the foregoing flow, whether a game player has used a plug-in may be determined, by employing an implementation mode of the present disclosure. Based on the foregoing flow, a corresponding operation may be further performed on the plug-in, by employing an implementation mode of the present disclosure.

In an implementation mode, when determining a game player has used a plug-in, the server may exclude the game player, or terminate the EMU class Internet game for the game player.

The server may also perform a corresponding punishment on a player with a plug-in, such as reduce a blood value, an HP, an experience value, an equipment value, a score, and so on. When a serious consequence is achieved by a player with a plug-in, the server may ban the Internet Protocol (IP) address of the player, and refuse the player to log on within a predetermined time, and so on.

Based on the foregoing flow, it can be seen that a better anti-plug-in function may be achieved, by employing the technical solution of the present disclosure, in which a game program may be not modified and only the EMU is modified. Besides, within the EMU, the monitored data may be timely transmitted to the server to be checked, in the manner of monitoring execution and data of a game program, so as to achieve the objective of anti-plug-in.

Applications about an implementation mode of the present disclosure will be described in the following, with monitoring a role blood value as an example.

When an instruction of a game program indicates to start execution, start the monitoring on the execution of instructions of the game program. It is necessary to learn from a game program manufacture about a program address (that is, monitoring address) which manipulates a role blood value, a mode to execute these program addresses (that is, monitoring type), a type for manipulating a role blood value (such as initialize a blood value, increase a blood value, reduce a blood value, and so on), as well as a storage location of a stack, which stores a blood value of this type.

During the process of executing an instruction, when meeting the two conditions of monitoring address and monitoring type, encrypt a type manipulating the role blood value and the blood value of this type (which may be read from a stack), and transmit to the server side.

After receiving the message, the server side may decrypt the message, analyze the type manipulating the role blood value and the blood value of this type. The server side may further analyze whether these two values are reasonable. The foregoing analysis process may be relevant with the type and state of the game program. When analyzing that these two values are not reasonable, the server side may determine that the role has used a plug-in. When analyzing that these two values are reasonable, a corresponding operation may be performed on the data of the server side. Subsequently, determining (that is, whether the role is dead when blood value is 0) and processing may be performed on the role state.

Figure 2:
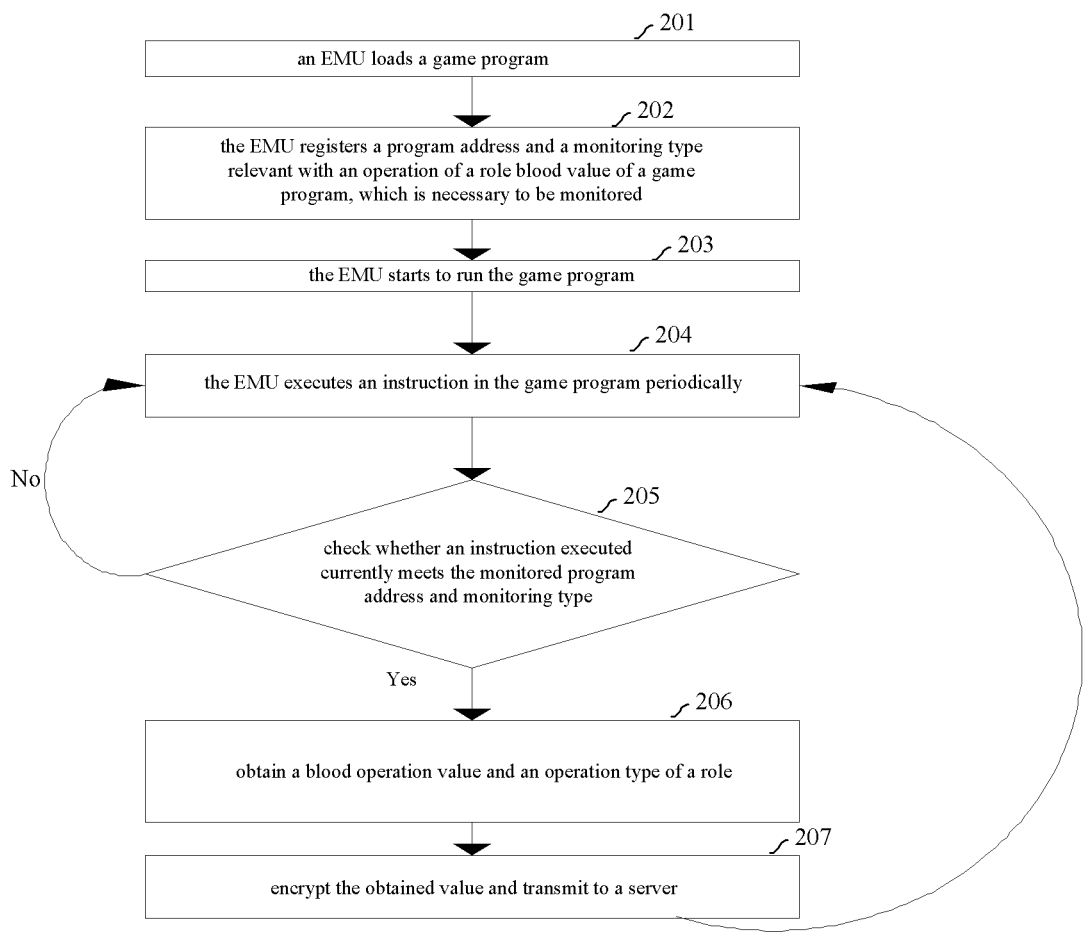
FIG. 2 is a flowchart illustrating a method for identifying a plug-in of an EMU class Internet game at a client side, in accordance with an example of the present disclosure.
Figure 3:
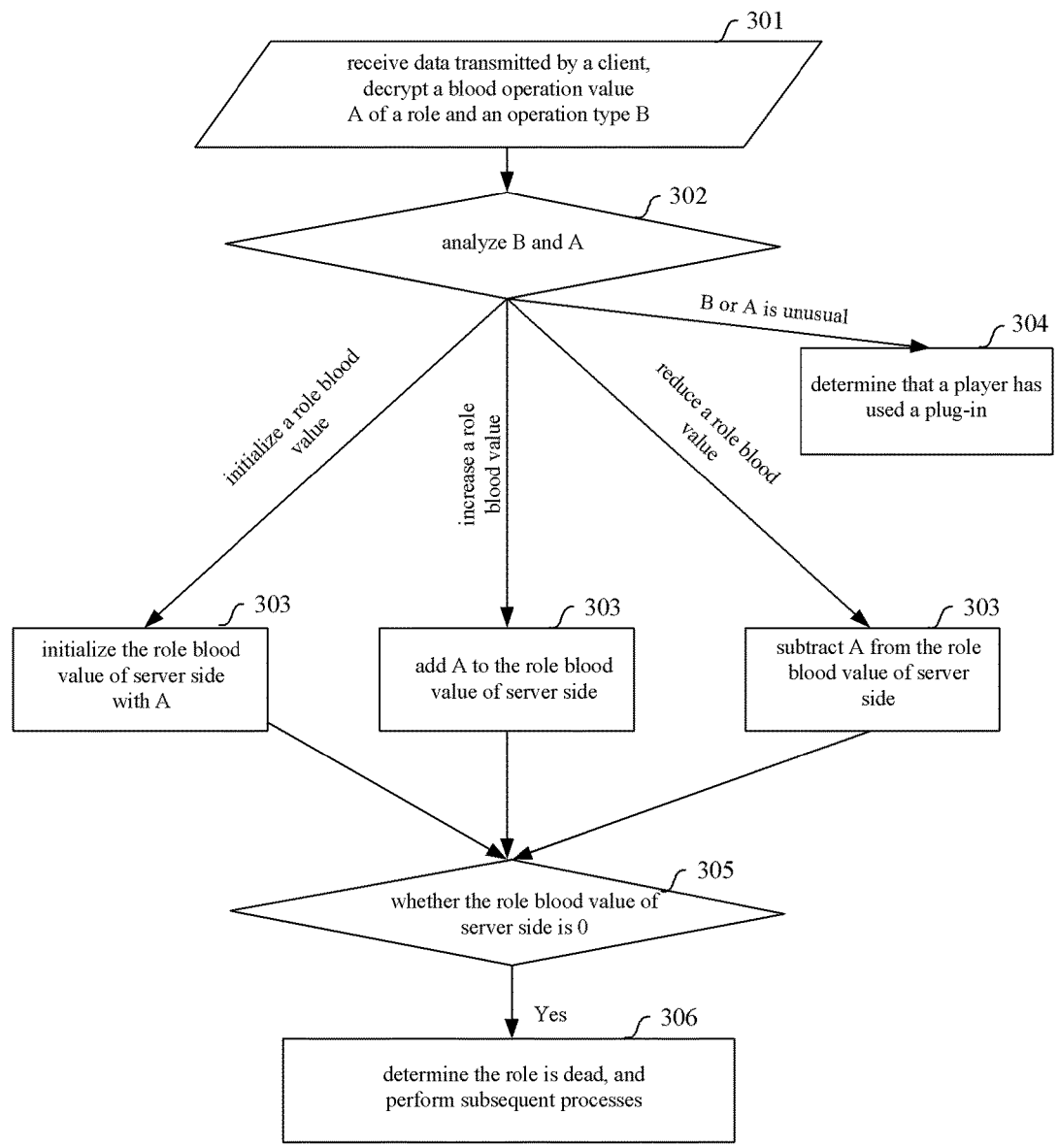
FIG. 3 is a flowchart illustrating a method for identifying a plug-in of an EMU class Internet game at a server side, in accordance with an example of the present disclosure.

More detailed descriptions may be provided for this instance, accompanying with FIG. 2 and FIG. 3.

FIG. 2 is a flowchart illustrating a method for identifying a plug-in of an EMU class Internet game at a client side, in accordance with an example of the present disclosure.

As shown in FIG. 2, the method may include the following blocks.

Block 201, an EMU loads a game program.

Block 202, the EMU registers a program address and a monitoring type relevant with role blood value of the game program, which are necessary to be monitored.

Block 203, the EMU starts to run the game program.

Block 204, the EMU executes an instruction in the game program periodically.

Block 205, the EMU checks whether an instruction executed currently is involved in the registered program address of the role blood value and corresponding monitoring type.

Block 206, the EMU obtains a blood operation value A of the role and an operation type B of the blood value from a location, such as a stack of the game program. For example, the operation type B of the blood value is to increase the blood value, or reduce the blood value, and so on.

Block 207, the EMU encrypts the obtained blood operation value A of the role and the operation type B of the blood value, and transmits to a client.

FIG. 3 is a flowchart illustrating a method for identifying a plug-in of an EMU class Internet game at a server side, in accordance with an example of the present disclosure.

As shown in FIG. 3, the method may include the following blocks.

Block 301, the server receives encrypted data from the client, decrypts the encrypted data received, and analyzes the blood operation value A of the role and current operation type B of the blood value.

Block 302, the server analyzes the blood operation value A of the role and current operation type B of the blood value, when finding the blood operation value A of the role and operation type B of the blood value are unusual, proceed with block 304 and terminate the flow; otherwise, proceed with block 303 and subsequent flow.

Block 303, when analyzing the operation type B of the blood value is to initialize a role blood value, initialize the role blood value of server side with the blood operation value A of the role; when analyzing the operation type B of the blood value is to increase the role blood value, add the blood operation value A of the role to an original role blood value at the server side; when analyzing the operation type B of the blood value is to reduce a role blood value, subtract the blood operation value A from an original value of the role blood at the server side.

Block 304, the server determines that the player has used a plug-in, at this time, the server may exclude the role, or terminate the EMU class Internet game for the role.

Block 305, the server determines whether the role blood value of the server side is 0; if yes, proceed with block 306.

Block 306, the server determines that the role is dead, and continuously proceeds with subsequently processes of the dead role.

Exemplary descriptions are provided for an implementation mode of the present disclosure, by taking a role blood value as an example. Persons having ordinary skill in the art may learn that, the implementation modes of the present disclosure are not limited by monitoring the role blood value. Whether a player has used a plug-in may also be determined by monitoring multiple kinds of critical parameters, such as the HP, the experience value, the equipment value, the score, and so on.

Based on foregoing detailed analysis, an implementation mode of the present disclosure also provides a system for identifying a plug-in of an EMU class Internet game.

Figure 4:
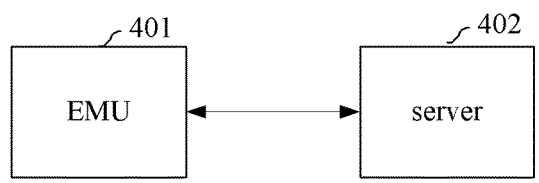
FIG. 4 is a schematic diagram illustrating structure of a system for identifying a plug-in of an EMU class Internet game, in accordance with an example of the present disclosure.

FIG. 4 is a schematic diagram illustrating structure of a system for identifying a plug-in of an EMU class Internet game, in accordance with an example of the present disclosure.

As shown in FIG. 4, the system may include an EMU 401 and a server 402.

The EMU 401 is configured to set a monitoring condition relevant with critical data of a game role, when the monitoring condition is met, the EMU 401 is configured to transmit the critical data of the game role to the server 402.

The server 402 is configured to analyze the critical data of the game role, when determining the critical data of the game role is unusual, the server 402 may determine that the game role has used a plug-in.

In an implementation mode, when determining the game role has used a plug-in, the sever 402 may exclude the game role, or terminate the EMU class Internet game for the game role.

In an implementation mode, the EMU 401 is configured to set a monitoring address and monitoring instruction, which are relevant with the critical data of game role. Specifically speaking, the monitoring instruction may include a function calling instruction relevant with the critical data of game role, a function returning instruction relevant with the critical data of game role, a sequence execution instruction relevant with the critical data of game role, a condition jumping instruction relevant with the critical data of game role, and so on.

Specifically speaking, the critical data of game role may include a blood value, a blood operation value, an operation type of the blood value; an HP, an HP operation value, an HP operation type; an experience value, an experience operation value, an operation type of the experience value; an equipment value, an equipment operation value, an operation type of the equipment value; a score, a score operation value, or a score operation type, and so on.

Although foregoing exemplary examples about the critical data of game role are provided in detail, persons having ordinary skill in the art may easily learn that the foregoing examples are not used for limiting the protection scope of the present disclosure.

Furthermore, to enhance information security, the EMU may transmit encrypted critical data of game role. Here, multiple existing encryption modes may be employed to encrypt the critical data of game role.

At this time, the EMU 401 is configured to transmit the encrypted critical data of game role to server 402. The server 402 is configured to decrypt the critical data of game role.

The EMU game may be run on a game platform of network arcade which is popular at present, such as Arclive platform, SupARC platform or ARC platform.

Persons having ordinary skill in the art may learn that, although some specific examples about game platform of network arcade are listed in detail, implementation modes of the present disclosure are not limited by the foregoing specific examples.

An example of the present disclosure also provides a machine readable storage medium, which may store instructions enabling a machine to execute the method for identifying a plug-in of an EMU class Internet game as mentioned above. Specifically speaking, a system or device with such storage medium may be provided. The storage medium may store software program codes, which may implement functions of any foregoing example. A computer (or Central Processing Unit (CPU), or Micro Processing Unit (MPU)) of the system or device may read and execute the program codes stored in the storage medium.

In this case, the program codes read from the storage medium may implement functions of any foregoing example. Thus, the program codes and storage medium may form a part of the present disclosure.

An example of the storage medium which provides the program codes may include software, hardware, magneto-optical disk, Compact Disk (CD) (such as CD-Read-Only Memory (ROM), CD-Recordable (CD-R), CD-ReWritable (RW), Digital Versatile Disc (DVD)-ROM, DVD-Random Access Memory (RAM), DVD-RW, DVD+RW), magnetic tape, non-volatile memory card and ROM. Alternatively, the program codes may be downloaded from a server computer via a communication network.

In addition, it can be seen that part of or all of the actual operations may be completed, by executing the program codes read by a computer, or by an Operating System (OS) of a computer based on instructions of the program codes, so as to implement functions of any foregoing example.

In addition, it should be understood that, the program codes read from the storage medium may be written into a memory, which is set within an expansion board of a computer, or an expansion board connected with the computer. Subsequently, part of or all of the actual operations may be executed by a CPU, which is installed on an expansion board or an expansion unit, based on instructions of the program codes, so as to implement functions of any foregoing example.

Figure 5:
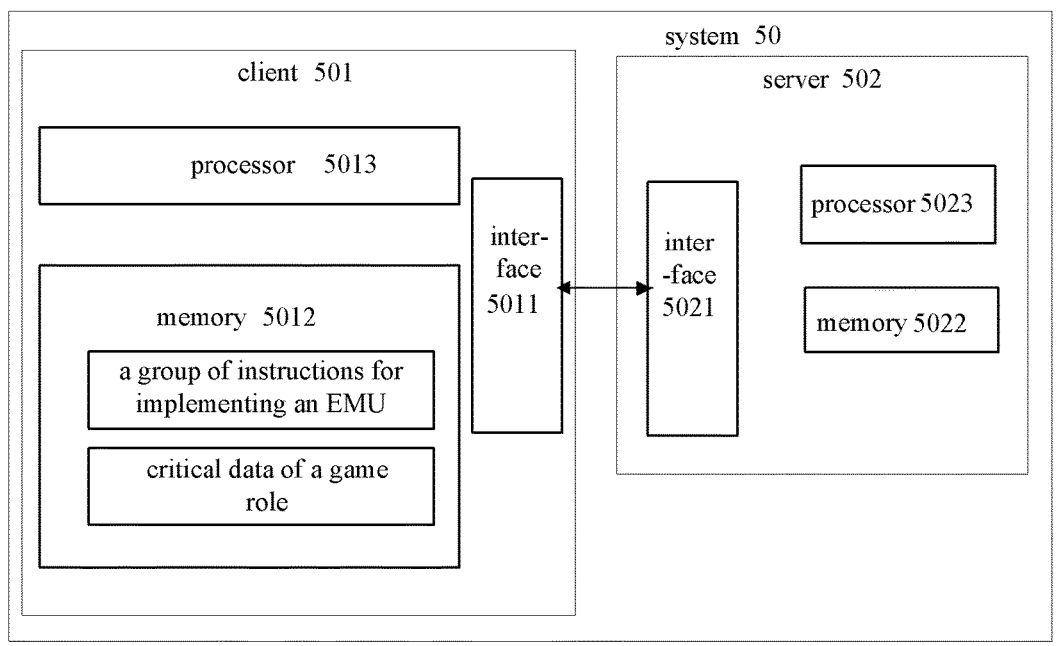
FIG. 5 is a schematic diagram illustrating structure of another system for identifying a plug-in of an EMU class Internet game, in accordance with an example of the present disclosure.

For example, FIG. 5 is a schematic diagram illustrating structure of another system for identifying a plug-in of an EMU class Internet game, in accordance with an example of the present disclosure.

As shown in FIG. 5, system 50 may include a client 501 and a server 502. Client 501 may include an interface 5011, a memory 5012 and a processor 5013 in communication with memory 5012. Memory 5012 may store a group of instructions, which may be executed by processor 5013 to implement an EMU, as well as critical data of a game role. Server 502 may include an interface 5021, a memory 5022, and a processor 5023 in communication with memory 5022.

The EMU is configured to set a monitoring condition relevant with critical data of a game role. When determining the monitoring condition is met, the EMU is further configured to transmit the critical data of the game role stored in memory 5012 to server 502, via interface 5011.

Interface 5021 in server 502 is configured to receive the critical data of the game role, and store into memory 5022.

Processor 5023 in server 502 is configured to read the critical data of the game role from memory 5022, and analyze the critical data of the game role. When determining the critical data of the game role is unusual, server 502 may determine that the game role has used a plug-in.

In an implementation mode, processor 5023 in server 502 is configured to exclude the game role, or terminate the EMU class Internet game for the game role, after determining the game role has used the plug-in.

In an implementation mode, the EMU is configured to set a monitoring address and a monitoring instruction, which are relevant with the critical data of the game role. Specifically speaking, the monitoring instruction may include a function calling instruction relevant with the critical data of the game role, a function returning instruction relevant with the critical data of the game role, a sequence execution instruction relevant with the critical data of the game role, a condition jumping instruction relevant with the critical data of the game role, and so on.

Specifically speaking, the critical data of the game role may include a blood value, a blood operation value, an operation type of the blood value; an HP, an HP operation value, an HP operation type; an experience value; an experience operation value; an operation type of the experience value; an equipment value; an equipment operation value; an operation type of the equipment value; a score; a score operation value, or a score operation type, and so on.

Although foregoing exemplary examples about critical data of a game role are listed in detail, persons having ordinary skill in the art may easily learn that the foregoing examples are not used for limiting the protection scope of the present disclosure.

To enhance information security, the EMU is further configured to encrypt the critical data of game role stored in memory 5012, and then indicate to transmit the encrypted critical data of game role to server 502 via interface 5011. Multiple existing encryption modes may be employed to encrypt the critical data of game role.

Interface 5021 in server 502 is configured to receive the encrypted critical data of game role, and store into memory 5022. Processor 5023 is configured to decrypt the encrypted critical data of game role.

In view of above, in the examples of the present disclosure, the EMU is configured to set a monitoring condition relevant with critical data of a game role. When the monitoring condition is met, the EMU is further to transmit the critical data of game role to the server. The server may analyze the critical data of game role. When determining the critical data of game role is unusual, the server may determine that the game role has used a plug-in. Thus, it can be seen that, after applying the implementation mode of the present disclosure, by monitoring the critical data of game role, such as the HP, the blood value, the score, and transmitting the critical data of game role to the server to be checked, the plug-in behavior of a player may be found timely.

Besides, by employing the implementation mode of the present disclosure, a corresponding process may be performed on a player with a plug-in. Thus, the fairness of a game may be further improved. Subsequently, an anti-plug-in function may be achieved by employing an implementation mode of the present disclosure, when no game program is modified.

The foregoing is only preferred examples of the present disclosure, which is not used for limiting the protection scope of the present disclosure. Any modifications, equivalent substitutions and improvements made within the spirit and principle of the present disclosure, should be covered by the protection scope of the present disclosure.

What is claimed is:

1. A method for identifying a plug-in of an unmodified Emulator (EMU) class Internet game, the method comprising:
    configuring, by an EMU, a monitoring condition relevant with critical data of a game role;
    when determining the monitoring condition is met, transmitting, by the EMU, the critical data of the game role to a server, such that the server analyzes the critical data of the game role, and determines that the game role has used the plug-in, when the server determining that the critical data of the game role is unusual;
    wherein configuring by the EMU the monitoring condition relevant with the critical data of the game role comprises:
    configuring, by the EMU, a monitoring address and a monitoring instruction, which are relevant with the critical data of the game role.

2. The method according to claim 1, wherein the monitoring instruction comprises at least one of:
    a function calling instruction relevant with the critical data of the game role, a function returning instruction relevant with the critical data of the game role, a sequence execution instruction relevant with the critical data of the game role, and a condition jumping instruction relevant with the critical data of the game role.

3. The method according to claim 1, wherein the critical data of the game role comprises at least one of:
    a blood value, a blood operation value, an operation type of the blood value, a Health Point (HP), an HP operation value, an HP operation type, an experience value, an experience operation value, an operation type of the experience value, an equipment value, an equipment operation value, an operation type of the equipment value, a score, a score operation value, or a score operation type.

4. The method according to claim 1, wherein transmitting by the EMU the critical data of the game role to the server comprises:
    transmitting, by the EMU, the encrypted critical data of the game role to the server, such that the server decrypts the encrypted critical data of the game role.

5. The method according to claim 1, wherein the monitoring address relevant with the critical data of the game role comprises an address, which is used for storing the critical data of the game role.

6. The method according to claim 1, wherein when determining the monitoring condition is met, transmitting by the EMU the critical data of the game role to the server comprises:
    when determining that an access operation about the monitoring address relevant with the critical data of the game role is involved, and/or, determining that the monitoring instruction relevant with the critical data of the game role is involved, transmitting, by the EMU, the critical data of the game role to the server.

7. A method for identifying a plug-in of an Emulator (EMU) class Internet game, comprising:
    configuring, by an EMU, a monitoring condition relevant with critical data of a game role;
    when determining the monitoring condition is met, transmitting, by the EMU, the critical data of the game role to a server;
    analyzing, by the server, the critical data of the game role;

when determining the critical data of the game role is unusual, determining, by the server, the game role has used the plug-in;

wherein configuring by the EMU the monitoring condition relevant with the critical data of the game role comprises:

configuring, by the EMU, a monitoring address and a monitoring instruction, which are relevant with the critical data of the game role.

8. The method according to claim 7, wherein the monitoring instruction comprises at least one of:

a function calling instruction relevant with the critical data of the game role, a function returning instruction relevant with the critical data of the game role, a sequence execution instruction relevant with the critical data of the game role, and a condition jumping instruction relevant with the critical data of the game role.

9. The method according to claim 7, wherein determining by the server the critical data of the game role is unusual comprises:

when analyzing that the critical data of the game role doesn't comply with game state, determining, by the server, the critical data of the game role is unusual.

10. The method according to claim 7, wherein analyzing by the server the critical data of the game role comprises:

analyzing, by the server, the critical data of the game role, by using type and state of the EMU class Internet game.

11. The method according to claim 7, wherein the monitoring address relevant with the critical data of the game role comprises an address, which is used for storing the critical data of the game role.

12. The method according to claim 7, wherein when determining the monitoring condition is met, transmitting by the EMU the critical data of the game role to a server comprises:

when determining that an access operation about the monitoring address relevant with the critical data of the game role is involved, and/or, determining that the monitoring instruction relevant with the critical data of the game role is involved, transmitting, by the EMU, the critical data of the game role to the server.

13. A client for identifying a plug-in of an Emulator (EMU) class Internet game, comprising an interface, a memory, and a processor in communication with the memory, wherein the memory is configured to store critical data of a game role, and a group of instructions, which are executed by the processor to implement an EMU, and the EMU is configured to:

set a monitoring condition relevant with the critical data of the game role;

when the monitoring condition is met, transmit the critical data of the game role to a server via the interface, such that the server analyzes the critical data of the game role, and determines that the game role has used the plug-in, when the server determining that the critical data of the game role is unusual;

wherein the EMU is further configured to set a monitoring address and a monitoring instruction, which are relevant with the critical data of the game role.

14. The client according to claim 13, wherein the monitoring instruction comprises at least one of:

a function calling instruction relevant with the critical data of the game role, a function returning instruction relevant with the critical data of the game role, a sequence execution instruction relevant with the critical data of the game role, and a condition jumping instruction relevant with the critical data of the game role.

15. The client according to claim 13, wherein the critical data of the game role comprises at least one of:

a blood value, a blood operation value, an operation type of the blood value, a Health Point (HP), an HP operation value, an HP operation type, an experience value, an experience operation value, an operation type of the experience value, an equipment value, an equipment operation value, an operation type of the equipment value, a score, a score operation value, or a score operation type.

16. The client according to claim 13, wherein the monitoring address relevant with the critical data of the game role comprises an address, which is used for storing the critical data of the game role.

17. The client according to claim 13, wherein the EMU is further configured to:

transmit the critical data of the game role to the server, when determining that an access operation about the monitoring address relevant with the critical data of the game role is involved, and/or, determining that the monitoring instruction relevant with the critical data of the game role is involved.

* * * * *